2,856,423
LIQUID COBALTOUS TOLUATE OXIDATION CATALYST

Richard L. Grantham, Downey, and Joseph E. Nickels, Los Angeles, Calif., assignors to Richfield Oil Corporation, Los Angeles, Calif., a corporation of Delaware No Drawing. Application October 20, 1955
Serial No. 541,824

4 Claims. (Cl. 260—524)

The present invention relates to an improved process for the preparation of toluic acids from xylenes and to improved catalyst compositions for use in this process.

Toluic acids have previously been prepared by oxidizing xylenes in the liquid phase by means of an oxygen-containing gas, such as air or air enriched with oxygen, using a salt of cobalt, manganese or cerium as the catalyst. This oxidation has been carried out in inert solvents such as carbon tetrachloride, benzene, acetic acid, butyric acid and the like, which are capable of dissolving both the catalyst and the xylene. The use of solvents for the reaction mixture is undesirable due to their high cost, the problem of solvent recovery and the fact that the solvents used are not in fact inert under the reaction conditions. It has been proposed to omit the solvent from the reaction mixture to obviate the disadvantages enumerated above but this expedient raises further problems. For example, under similar reaction conditions the omission of the solvent can result in the production of increased quantities of phthalic acids rather than the desired toluic acids.

An improved process for the production of toluic acids, described in U. S. Patent 2,696,499, provides for the oxidation of xylenes at a rapid rate in good yield with a minimum production of phthalic acids without the use of an extraneous solvent for the reaction mixture. This process employs air or other oxygen-rich gases and a catalyst such as a cobalt, manganese or cerium salt, particularly a cobalt soap such as the toluate, at a temperature within the range from 130 to 190° C. or preferably from about 140 to 150° C. The oxidation reaction is allowed to proceed until from 10 to 50% or preferably about 20 to 40% of the aromatics are converted or oxidized to oxygen-containing compounds. When the oxidation is carried out to this extent approximately 5 to 15% by weight of oxygen is absorbed by the reaction mixture based upon the aromatics content.

The optimum pressure employed in the improved process of Patent 2,696,499 is a function of the temperature of the oxidation and economic factors. The temperature of the oxidation reaction controls the water content of the oxidation mixture at a given pressure. Conversely, at a given reaction temperature, the working pressure should not be allowed to exceed that which allows the majority of the water formed to be removed in the effluent gas stream. Excess water poisons the catalyst in the oxidation reaction, possibly by removing the catalyst from the hydrocarbon layer. Generally the reaction pressure is maintained within the range from about 100 to 500 p. s. i. g. and preferably within the range from about 100 to 250 p. s. i. g. A pressure of 200 p. s. i. g. allows adequate water removal, gives an adequate oxidation rate and is economical of the materials of construction of the reaction vessel. The catalyst employed in this process can be prepared by pouring molten cobaltous toluate into cold xylene to produce a fine dispersion with good flow characteristics.

Although the production of toluic acids by the method described in Patent 2,696,499 is commercially feasible, disadvantages can accrue from the nature of certain catalyst compositions. For example, the preferred catalyst, cobaltous toluate, which is both highly active for the oxidation of xylenes to toluic acids and advantageous in that it does not introduce foreign or diluting materials into the reaction mixture, is difficult to handle since it is not entirely soluble in the reaction mixture. For example, it has been found that the solubility of cobaltous toluate in xylene is about 2.5% at 42° C. or 4.6% at 110° C. Therefore, when a cobaltous toluate catalyst is prepared by reacting a cobalt salt with toluic acid at elevated temperatures with subsequent addition of the melt to xylene the resulting catalyst mixture, although effective as a catalyst for the oxidation reaction, contains only a small amount of catalyst in solution, the majority being in suspension. This catalyst suspension is unstable on storage, tending to settle out after short periods of time to form a hard layer of solid material which is difficult to re-suspend or redissolve in xylene. This settling of the dispersed phase decreases the catalyst concentration in solution and/or suspension and can therefor result in erratic plant operation. Further, it is difficult to control the addition to the reaction mixture of a catalyst which is partially in solution and partially in suspension due to problems in pumping and metering the mixture. The settling of solids from the dispersed phase plugs lines and screens and, as the sediment builds up, alters pressure and flow characteristics necessitating frequent shutdown for cleaning of the catalyst handling system. A further disadvantage of the catalyst suspension described above is that the active component of the mixture, cobaltous toluate, is not completely utilized due to the fact that part of the catalyst exists in a separate solid phase which requires time to dissolve after it is introduced into the reaction mixture. The solid phase of the catalyst suspension may also be precipitated before solution in the reaction mixture is achieved since small amounts of water and acetic acid as well as air in the reaction mixture increase the rate of settling of the solid phase. Therefore, in order to realize the maximum activity of the catalyst it would be desirable to introduce it as a true solution which is completely compatible with the reaction mixture.

The present invention provides a method for preparing homogeneous cobaltous toluate catalyst compositions which can be maintained in the liquid state at temperatures as low as about 30° C. and which are stable on storage. The new catalyst compositions are also readily soluble in the xylene-containing reaction mixtures used in the production of toluic acids. The new catalyst solutions, furthermore, do not contain a suspended solid phase and therefore, since they are liquids at somewhat above room temperature, can be readily pumped, controlled and metered. In addition to their other desirable characteristics the new catalyst compositions are homogeneous and compatible with xylenes, providing a means for maintaining a constant catalyst concentration in the reaction mixture thus assuring maximum catalyst activity and utilization. These advantages of the catalyst compositions of the present invention are obtained without the use of extraneous solvents or the necessity of introducing an anionic material other than the toluate radical to the reaction mixture.

The present invention comprises reacting a suitable cobalt salt with an excess of toluic acid to form a eutectic mixture of cobaltous toluate and toluic acid. Any cobalt salt soluble in toluic acid which will react with toluic acid to produce the desired cobaltous toluate can be employed, e. g. the salts of cobalt with weak acids such as cobalt carbonate, cobalt acetate and the like. Cobaltous toluate itself can, of course, be dissolved in toluic acid to produce the mixtures of the present invention. The eutectic mixture is homogeneous and soluble in the xylene reaction mixture and has a depressed freezing point relative to the freezing point of cobaltous toluate. The homogeneous catalyst compositions of the present invention are prepared using about 3 to 10 moles or preferably 4 to 6 moles of toluic acid per mole of cobalt salt. This provides a ratio of about 1 to 8 or preferably about 2 to 4 mols of toluic acid per mole of cobaltous toluate in the resulting catalyst mixture. It has also been found that the use of a slight excess of toluic acid above that required to produce the maximum lowering of the freezing point of the catalyst compositions further reduces the viscosity of the catalyst mixtures and increases their ability to be pumped and metered. Cobaltous toluate prepared without employing an excess of toluic acid solidifies at approximately 150° C. and is too viscous when molten at this temperature to permit pumping. When cobaltous toluate is prepared by the process of the present invention utilizing from 3 to 10 moles of toluic acid per mole of cobalt carbonate, for example, a homogeneous catalyst mixture is produced, the freezing point of which can be reduced to about 30° C. and the viscosity decreased to such an extent that the catalyst mixture can be readily pumped and handled as a liquid at temperatures as low as about 90° C.

The catalyst compositions of the present invention can be prepared from commercial or pure grades of cobalt salts and toluic acids. For example, suitable toluic acid fractions have the following compositions:

TABLE I

| Sample No. | 1 | 2 |
| --- | --- | --- |
| Composition: | | |
| Benzoic acid, weight percent | | 0.5 |
| Ortho toluic acid, weight percent | 1.5 | 1.0 |
| Meta toluic acid, weight percent | 69.7 | 77.5 |
| Para toluic acid, weight percent | 25.3 | 20.0 |
| Neutrals | 3.5 | 1.0 |

Neutrals are defined as secondary reaction products obtained from the air oxidation of mixed xylenes and may contain acetophenone, obtained from ethyl benzene, tolualdehyde and other oxygenated materials. Commercial grade cobalt carbonate, 95% pure, has been found to be entirely satisfactory in the preparation of the eutectic mixtures and catalyst compositions of the present invention.

The catalyst compositions of the present invention can be prepared by reacting 1 mole of cobalt carbonate or other suitable cobalt salt, with 3 to 10 moles, preferably 4 to 6 moles, of toluic acid at temperatures ranging from about 100–250° C. preferably at about 190 to 220° C. until the reaction is substantially complete. The reaction of the cobalt salt with toluic acid ordinarily requires about 1 to 2 hours. The product can be transferred to storage at temperatures of 90° C. or higher and maintained in the molten condition without precipitation of cobaltous toluate until used, or alternatively, the product can be allowed to solidify, in which case it must be remelted on use. The preparation of typical cobaltous toluate-toluic acid catalyst compositions of the present invention can be illustrated by the following examples:

*Example I*

One mole of cobalt carbonate was reacted with two moles of crude toluic acids, produced by the air oxidation of mixed xylenes, at a temperature of 210° C. for one hour. The product, which had a freezing point of 154° C. and a glass-like consistency when solidified, was melted and two moles of crude toluic acid added. The freezing point of the mixture was thereby lowered to 43° C. and the viscosity reduced to such an extent that the catalyst composition was easily pumpable at 115° C. Incremental amounts of toluic acid were added to the melt until the eutectic temperature of the mix was reached. It was observed that the eutectic mixture contained 0.26 mole fraction of cobaltous toluate and had a freezing point of 30° C. Table II below shows the relationship between the mole fraction of cobaltous toluate and the freezing point of the catalyst composition of this example.

TABLE II

| Eutectic mixture—Cobaltous toluate and toluic acid—Mole fraction of cobaltous toluate | Freezing point, ° C. |
| --- | --- |
| 1.0 | 154 |
| .33 | 43 |
| .30 | 41 |
| .27 | 33 |
| .26 | 30 |
| .24 | 35 |
| .22 | 41 |
| .19 | 51 |

*Example II*

The procedure of Example I was duplicated utilizing a different batch of toluic acids to produce a cobaltous toluate catalyst composition which formed a eutectic mixture at a cobaltous toluate concentration of 0.26 mole fraction as in Example I. The freezing point of this composition was 22° C. Table III below shows the relationship between the mole fraction of cobaltous toluate and the freezing point of the catalyst composition prepared in this example.

TABLE III

| Eutectic mixture—Cobaltous toluate and toluic acid—Mole fraction of cobaltous toluate | Freezing point, ° C. |
| --- | --- |
| 1.0 | 150 |
| .5 | 70 |
| .33 | 42 |
| .26 | 22 |
| .25 | 30 |
| .20 | 55 |

The effect of the use of excess toluic acid above that required to produce the maximum lowering of the freezing point of the cobaltous toluate-toluic acid catalyst mixtures of the present invention is illustrated by the fact that a composition prepared by the reaction of 4 moles of toluic acid with 1 mole of cobalt carbonate had a freezing point of 43° C. and a viscosity which enabled it to be easily pumped at 120° C. whereas a composition prepared by the reaction of 6 moles of toluic acid with 1 mole of cobalt carbonate had a higher freezing point, 51° C., (since it contained more toluic acid than the eutectic mixture) but a reduced viscosity which enabled it to be easily pumped at 90° C. Therefore, it can be seen that the process of the present invention provides homogeneous cobaltous toluate catalyst compositions, useful in the oxidation of xylenes to toluic acids, which are easily pumped and handled in the liquid phase at temperatures of about 90° C. or higher.

The catalyst compositions of the present invention can be employed with advantage in the usual processes for the oxidation of xylenes to toluic acids. For instance, the new compositions provide improved results when substituted for the xylene suspensions of cobaltous toluate employed as a catalyst in the process described in U. S. Patent 2,696,499. The catalyst compositions are advantageously employed for the air oxidation of xylenes to toluic acids at temperatures in the range from about 130 to 190° C. or preferably at about 140 to 150° C. with pressures ranging from about atmospheric up to about 500 p. s. i. g. or more. The various catalyst compositions are added to the reaction mixtures in amounts which will provide from about 0.1 to 5.0% of catalyst by weight based on the aromatics content of the reaction mixture. Ordinarily, it is preferred to employ less than 1% by weight of the catalyst; 0.5% being sufficient in most cases. More specifically, the catalyst compositions of Examples I and II are employed in amounts corresponding to 0.5% by weight based on the xylene reaction mixture at a temperature of 150° C. and a pressure of 200 p. s. i. g. to produce satisfactory yields of toluic acids.

It is to be understood that the specific examples provided above are for illustration only and are not to be construed as limiting the scope of the invention.

We claim:

1. In a process for the preparation of toluic acids by the liquid phase oxidation of the corresponding xylenes with an oxygen-rich gas in the presence of a cobaltous toluate catalyst the improvement which comprises introducing said cobaltous toluate catalyst to said xylenes in the form of a liquid catalyst consisting essentially of a solution of cobaltous toluate and toluic acid, the molar ratio of toluic acid to cobaltous toluate in said solution being about 1 to 4:1.

2. In a process for the preparation of toluic acids by the liquid phase oxidation of the corresponding xylenes with an oxygen-rich gas in the presence of a cobaltous toluate catalyst the improvement which comprises introducing said cobaltous toluate catalyst to said xylenes in the form of a liquid catalyst consisting essentially of a solution of cobaltous toluate and toluic acid, the molar ratio of toluic acid to cobaltous toluate in said solution being about 2 to 4:1.

3. A homogeneous catalyst useful in the liquid phase oxidation of xylenes to toluic acids consisting essentially of a solution of cobaltous toluate and toluic acid, the molar ratio of toluic acid to cobaltous toluate in said solution being about 1 to 4:1.

4. A homogeneous catalyst useful in the liquid phase oxidation of xylenes to toluic acids consisting essentially of a solution of cobaltous toluate and toluic acid, the molar ratio of toluic acid to cobaltous toluate in said solution being about 2 to 4:1.

References Cited in the file of this patent

UNITED STATES PATENTS

| | | |
|---|---|---|
| 2,552,268 | Emerson et al. | May 8, 1951 |
| 2,552,278 | Hochwalt | May 8, 1951 |
| 2,696,499 | Himel | Dec. 7, 1954 |
| 2,727,921 | Taves | Dec. 20, 1955 |